United States Patent
Nakabayashi

(10) Patent No.: US 8,273,437 B2
(45) Date of Patent: Sep. 25, 2012

(54) SHEET MATERIAL FOR MULTILAYER OPTICAL RECORDING MEDIUM, MULTILAYER STRUCTURAL BODY FOR OPTICAL RECORDING MEDIUM, AND MULTILAYER OPTICAL RECORDING MEDIUM

(75) Inventor: Masahito Nakabayashi, Itabashi-ku (JP)

(73) Assignee: LINTEC Corporation, Tokyo (JP)

( * ) Notice: Subject to any disclaimer, the term of this patent is extended or adjusted under 35 U.S.C. 154(b) by 397 days.

(21) Appl. No.: 12/452,315

(22) PCT Filed: Jul. 4, 2008

(86) PCT No.: PCT/JP2008/062541
§ 371 (c)(1),
(2), (4) Date: Dec. 23, 2009

(87) PCT Pub. No.: WO2009/005176
PCT Pub. Date: Jan. 8, 2009

(65) Prior Publication Data
US 2010/0143638 A1 Jun. 10, 2010

(30) Foreign Application Priority Data
Jul. 5, 2007 (JP) .................... 2007-177477

(51) Int. Cl.
*B32B 3/02* (2006.01)
(52) U.S. Cl. .................. 428/64.1; 428/64.4; 430/270.14
(58) Field of Classification Search .................. 428/64.4; 430/270.14
See application file for complete search history.

(56) References Cited

U.S. PATENT DOCUMENTS

| 7,731,871 B2 * | 6/2010 | Inoue ........................... 264/1.33 |
| 7,758,940 B2 * | 7/2010 | Miyata et al. ................. 428/64.1 |
| 7,799,404 B2 * | 9/2010 | Kitano et al. ................. 428/64.4 |
| 2003/0068513 A1 * | 4/2003 | Kubota et al. ................. 428/500 |
| 2005/0013236 A1 | 1/2005 | Hirokane et al. |
| 2005/0142318 A1 | 6/2005 | Nakabayashi et al. |
| 2006/0180271 A1 | 8/2006 | Yokoyama et al. |
| 2009/0161502 A1 | 6/2009 | Shiono |

FOREIGN PATENT DOCUMENTS
EP 1548724 A1 6/2005
(Continued)

OTHER PUBLICATIONS
Extended European Search Report dated Jul. 21, 2011 including the Supplementary European Search Report and the European Search Opinion in the corresponding EP Application 08778062.3.

*Primary Examiner* — Elizabeth Mulvaney

(57) ABSTRACT

A sheet material for a multilayer optical recording medium (10-*a*) which comprises an optical recording layer comprising a multiple-photon absorbing material (1), an adhesive layer (4) and a transfer layer of the energy beam curable type (3). The transfer layer of the energy beam curable type (3) is a layer for transferring the shape of a stamper having a shape having protrusions and depressions on the surface as recording pits and/or grooves. The transfer layer of the energy beam curable type (3) and the adhesive layer (4) are each disposed as outermost layers. A multilayer optical recording medium which has a repetitive structure comprising a plurality of laminated optical recording layers and exhibits excellent accuracy of thickness of each layer and the whole laminate can be produced with excellent productivity. Positional information can be contained at the inside of the optical recording medium.

24 Claims, 3 Drawing Sheets

FOREIGN PATENT DOCUMENTS

| | | |
|---|---|---|
| JP | 06-028672 A | 2/1994 |
| JP | 11-250496 A | 9/1999 |
| JP | 2005-149657 A | 6/2005 |
| JP | 2005-209328 A | 8/2005 |
| JP | 2005-259192 A | 9/2005 |
| JP | 2005-285211 A | 10/2005 |
| JP | 2006-221767 A | 8/2006 |
| WO | 2007/055249 A1 | 5/2007 |

* cited by examiner

SHEET MATERIAL FOR MULTILAYER OPTICAL RECORDING MEDIUM, MULTILAYER STRUCTURAL BODY FOR OPTICAL RECORDING MEDIUM, AND MULTILAYER OPTICAL RECORDING MEDIUM

This application is the United States national phase application of International Application PCT/JP2008/062541 filed Jul. 4, 2008.

TECHNICAL FIELD

The present invention relates to a sheet material for a multilayer optical recording medium, a multilayer structural body for an optical recording medium and a multilayer optical recording medium. More particularly, the present invention relates to a sheet material which enables to produce a multilayer optical recording medium exhibiting excellent accuracy of thickness of each layer and the whole laminate with excellent productivity and to contain positional information at the inside of the optical recording medium; a multilayer structural body for optical recording formed by using the sheet material and containing positional information at the inside; and a multilayer optical recording medium which comprises the multilayer structural body, exhibits excellent accuracy of thickness of each layer and the whole layer, can prevent formation of wrinkles and contains positional information at the inside.

BACKGROUND ART

Recently, optical recording media are attracting attention since a great amount of information can be recorded and are used in various applications. Methods for three dimensionally recording data are proposed to further increase the density of recording.

For example, in Patent Reference 1, a recording method in which laser light is concentrated on a photosensitive material, data are written three dimensionally as changes in the refractive index, and the recorded data are read using a confocal microscope of the reflection type, is disclosed. As the optical recording medium used for the above recording method, a multilayer optical recording medium in which a photorefractive material such as lithium niobate, a photochromic coloring matter giving reversible structural change with light such as a diarylethene and spiropyran, a compound giving photoisomerization such as azobenzene and stilbene, a substance obtained by modifying a macromolecular structure with the above coloring matter or compound or a combination of an agent which absorbs two photons and generates an acid with light and a coloring matter developing color with the acid is used for the optical recording layer, and a non-recording layer comprising a material which cannot record information with light is introduced between the optical recording layers to decrease crosstalk, is proposed (refer to Patent Reference 2).

It has been found by the present inventors that the multilayer optical recording medium having the structure described above can be produced with excellent productivity by using a pressure sensitive adhesive sheet in which an optical recording layer and a layer of a pressure sensitive adhesive as the non-recording layer are laminated (refer to Patent Reference 3).

It is proposed that, in the multilayer optical recording medium described above, positional information specifically describing the position in the three dimensional space is contained at the inside of the optical recording medium (refer to Patent Reference 4). In the method of laminating sheets comprising an optical recording layer and a layer of a pressure sensitive adhesive, it has been difficult that the positional information described above is contained.

[Patent Reference 1] Japanese Patent Application Laid-Open No. Heisei 6(1994)-28672
[Patent Reference 2] Japanese Patent Application Laid-Open No. Heisei 11(1999)-250496
[Patent Reference 3] Japanese Patent Application Laid-Open No. 2005-209328
[Patent Reference 4] Japanese Patent Application Laid-Open No. 2005-285211

DISCLOSURE OF THE INVENTION

Problems to be Overcome by the Invention

Under the above circumstances, the present invention has an object of providing a sheet material which enables to produce a multilayer optical recording medium exhibiting excellent accuracy of thickness of each layer and the whole laminate with excellent productivity and to contain positional information at the inside of the optical recording medium; a multilayer structural body for optical recording formed by using the sheet material and containing positional information at the inside; and a multilayer optical recording medium which comprises the multilayer structural body, exhibits excellent accuracy of thickness of each layer and the whole layer, can prevent formation of wrinkles and contains positional information at the inside.

Means for Overcoming the Problems

As the result of intensive studies by the present inventors to achieve the above object, it was found that the object could be achieved by using a sheet material comprising a transfer layer of the energy beam curable type for transferring the shape of a stamper having a shape having protrusions and depressions on the surface as recording pits and/or grooves, an optical recording layer comprising a multiple-photon absorbing material and an adhesive layer.

It was also found that formation of wrinkles during lamination can be prevented and interpenetration of the optical recording layer and the transfer layer could be prevented by disposing a transparent resin layer in the sheet material described above.

The present invention has been completed based on the above knowledge.

The present invention provides:

[1] A sheet material for a multilayer optical recording medium which is a sheet material for preparing a multilayer optical recording medium having a repetitive structure comprising a plurality of laminated optical recording layers and comprises optical recording layers comprising a multiple-photon absorbing material, an adhesive layer and a transfer layer of an energy beam curable type, wherein the transfer layer of an energy beam curable type is a layer for transferring a shape of a stamper having protrusions and depressions on a surface as recording pits and/or grooves, and the transfer layer of an energy beam curable type and the adhesive layer are each disposed as outermost layers;

[2] The sheet material for a multilayer optical recording medium described in [1], which further comprises a transparent resin layer;

[3] The sheet material for a multilayer optical recording medium described in any one of [1] and [2], wherein the transparent resin layer has a thickness of 1 to 100 µm, a glass transition temperature of 50° C. or higher and an elongation at break smaller than 300%;

[4] The sheet material for a multilayer optical recording medium described in any one of [1] to [3], wherein an adhesive constituting the adhesive layer comprises a (meth)acrylic acid ester-based copolymer as an adhesive component;

[5] The sheet material for a multilayer optical recording medium described in any one of [1] to [4], wherein the transfer layer of an energy beam curable type is a layer formed by transferring the shape of a stamper having protrusions and depressions on a surface, followed by curing by irradiation with an energy beam;

[6] A multilayer structural body for optical recording medium which comprises the sheet materials for a multilayer optical recording medium described in [5] laminated via the adhesive layers disposed as outermost layers of the sheet materials;

[7] A multilayer structural body for optical recording medium which is a multilayer structural body for optical recording medium having a repetitive structure comprising a plurality of laminated optical recording layers, wherein the repetitive structure has a structure in which a plurality of units comprising at least an optical recording layer comprising a multiple-photon absorbing material and an adhesive layer are laminated via the adhesive layer, and at least one sheet material described in [5] is disposed between the units; and

[8] A multilayer optical recording medium which comprises the multilayer structural body described in any one of [6] and [7].

The Effect of the Invention

In accordance with the present invention, the sheet material which enables to produce a multilayer optical recording medium exhibiting excellent accuracy of thickness of each layer and the whole laminate with excellent productivity and to contain positional information at the inside of the optical recording medium; the multilayer structural body for optical recording formed by using the sheet material and containing positional information at the inside; and the multilayer optical recording medium which comprises the multilayer structural body, exhibits excellent accuracy of thickness of each layer and the whole layer, can prevent formation of wrinkles and contains positional information at the inside, can be provided.

Figure 1:
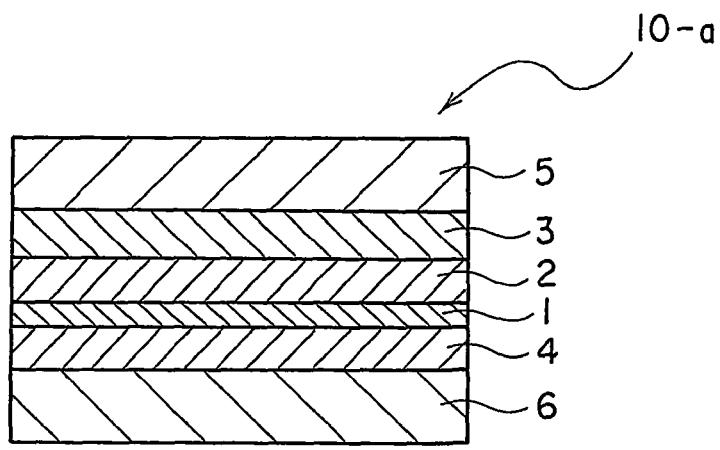
FIG. 1 shows a sectional view exhibiting a construction of an embodiment of Sheet material A for a multilayer optical recording medium of the present invention having release films.

In the Figures, reference numerals mean as follows: 1, 1-1, 1-2, 1-3 and 1-*n*: optical recording layers; 2, 2-1, 2-2, 2-3 and 2-*n*: transparent resin layers; 3: a transfer layer of the energy beam curable type; 4, 4-1, 4-2, 4-3 and 4-*n*: adhesive layers; 5: Release film I; 6: Release film II; 7, 7-1, 7-2, 7-3 and 7-*n*: cured transfer layers; 7*a*: recording pits and/or grooves; 8: a substrate; 9: a release film; 10-*a* and 10-*b*: Sheet material A having release films; 20: Sheet material B having a release film; 30: Multilayer structural body A; 40: a laminate sheet having a three layer structure and having a release film; and 50: Multilayer structural body B.

THE MOST PREFERRED EMBODIMENT TO CARRY OUT THE INVENTION

The sheet material for a multilayer optical recording medium of the present invention (hereinafter, referred to as a sheet material, occasionally) will be described in the following.

The sheet material for a multilayer optical recording medium of the present invention comprises two embodiments which are Sheet material A for a multilayer optical recording medium (hereinafter, occasionally referred to as Sheet material A) and Sheet material B for a multilayer optical recording medium (hereinafter, occasionally referred to as Sheet material B) as described in the following.

[Sheet Material A for a Multilayer Optical Recording Medium]

Sheet material A for a multilayer optical recording medium of the present invention is a sheet material for preparing a multilayer optical recording medium having a repetitive structure comprising a plurality of laminated optical recording layers and comprises optical recording layers comprising a multiple-photon absorbing material, an adhesive layer and a transfer layer of the energy beam curable type, wherein the transfer layer of the energy beam curable type is a layer for transferring the shape of a stamper having a shape of protrusions and depressions on the surface as recording pits and/or grooves, and the transfer layer of the energy beam curable type and the adhesive layer are each disposed as outermost layers.

(Optical Recording Layer)

The material constituting the optical recording layer in Sheet material A of the present invention is not particularly limited as long as Sheet material A comprises a multiple-photon absorbing material and can be selected as desired from materials conventionally used as the material constituting an optical recording layer in optical recording media. The multiple-photon absorbing material means a compound exhibiting the property such that the material absorbs at least two photons simultaneously and makes transition into the excited state. It is preferable that the sheet material comprises a two-photon absorbing material which has a sectional area for two-photon absorption of 0.1 GM or greater and more preferably 100 GM or greater from the standpoint of obtaining the recording sensitivity sufficient for practical application. Examples of the material constituting the optical recording layer described above include a material constituting the optical recording layer constituted with the multiple-photon absorbing material alone, a material constituting the optical recording layer constituted, for example, with the multiple-photon absorbing material and other reactive compounds which make a change by energy transfer from the excited multiple-photon absorbing material and a material constituting the optical recording layer constituted with a material comprising the above materials in the matrix. "GM" descrobed above means $10^{-50}$ cm$^4$·s·molecule$^{-1}$·photon$^{-1}$.

The material constituting the matrix may be an organic material or an inorganic material. Organic macromolecular materials are preferable since the sheet material of the present invention can be produced more easily, and the selection from many types of materials is possible. The macromolecular material may be a homopolymer or a copolymer. The type of the monomer, the molecular weight of the monomer and the form of the polymerization are not particularly limited.

Examples of the macromolecular material include polyolefins such as various types of polyethylene, ethylene/1-butene copolymers, ethylene/4-methyl-1-pentene copolymers, ethylene/1-hexene copolymers, polypropylene, ethylene/propylene copolymers, propylene/1-butene copolymers, poly1-butene, 1-butene/4-methyl-1-pentene copolymers, poly4-methyl-1-pentene, poly3-methyl-1-butene, ethylene/cyclic olefin copolymers and cyclic olefin-based resins; ethylene/vinyl acetate copolymers; ethylene/acrylic acid copolymers and metal salts thereof; poly(meth)acrylates such as polymethyl methacrylate and cyclic acrylic resins; polyester-based resins such as polyethylene terephthalate and polyethylene naphthalate; fluororesins such as polyperfluoroethylene and perfluoroalkenyl vinyl ether polymers; polystyrenes; polyvinyl alcohols; polycarbonates; polyphenylene sulfide; polyether sulfones; polyimides; polyphenylene oxides, olefin/N-substituted maleimide copolymers, allyl carbonate resins; epoxyalkylate resins; and urethane acrylate resins. The macromolecular material may be used singly or in combination of two or more.

In the present invention, the descriptions such as (meth)acrylic and (meth)acrylate means both of acrylic and methacrylic and both of methacrylate and methacrylate, respectively.

The multiple-photon absorbing material may be a species chemically bonded to the matrix described above as the main chain or as side chains or a material simply dispersed or dissolved in the matrix. The multiple-photon absorbing material is not particularly limited, and various compounds can be used. Examples of the multiple-photon absorbing material include cyanine coloring matters, styryl coloring matters, pyrilium coloring matters, thiapyrilium coloring matters, merocyanine coloring matters, arylidene coloring matters, oxonol coloring matters, squarylium coloring matters, azulenium coloring matters, coumarine coloring matters, pyran coloring matters, quinone coloring matters, anthraquinone coloring matters, triphenylmethane coloring matters, diphenylmethane coloring matters, xanthene coloring matters, thioxanthene coloring matters, phenothiazine coloring matters, azo coloring matters, azomethine coloring matters, fluorenone coloring matters, diarylethene coloring matters, spiropyran coloring matters, fulgide coloring matters, perylene coloring matters, polyene coloring matters, diphenylamine coloring matters, quinacridone coloring matters, azulenium coloring matters, porphyrin coloring matters, phthalocyanine coloring matters, styrene-based coloring matters, phenylenevinylene coloring matters and carbazole-based coloring matters.

Examples of the method for recording using a compound absorbing multiple photons include a method in which modulation of the refractive index is read using a material isomerizable with light such as a compound having azo group, C=C group or C=N group, a material polymerizable with light, a material making a reversible structural change with light such as an organic photochromic material or an organic refractive material forming charge distribution with light; a method in which fluorescence is read using a material making a change in the fluorescent characteristic with light; and a method in which modulation of the absorbance or modulation of the refractive index is read using a combination of a material generating an acid with light and a coloring matter forming color with the acid or a combination of an agent erasing color and a coloring matter having the property of erasing the color. In the above methods of recording, the compound absorbing multiple photons itself may have the reactivity with light described above, or the reaction may be induced by energy transfer from the compound absorbing multiple photons excited by absorption of multiple photons to another reactive compound.

In Sheet material A of the present invention, the thickness of the optical recording layer is not particularly limited. The thickness is, in general, about 0.1 to 50 μm and preferably 0.2 to 10 μm.

(Adhesive Layer)

In Sheet material A of the present invention, the adhesive constituting the adhesive layer is not particularly limited. Adhesives which exhibit the pressure sensitive adhesive property at the temperature of lamination in the preparation of Multilayer structural body A of the present invention and, also, the adhesive property to the cured transfer layer on which the recording pits and/or grooves have been formed, is used. In particular, pressure sensitive adhesives exhibiting the pressure sensitive adhesive property at the ordinary temperature are preferable. As the pressure sensitive adhesive described above, acrylic pressure sensitive adhesives are preferable from the standpoint of the optical applications.

As the acrylic pressure sensitive adhesive, for example, pressure sensitive adhesives comprising a (meth)acrylic acid ester-based copolymer and a crosslinking agent are preferable.

Examples of the (meth)acrylic acid ester-based copolymer include copolymers of a (meth)acrylic acid ester in which the alkyl group in the ester portion has 1 to 20 carbon atoms, a monomer having a functional group having active hydrogen and other monomers which are used where desired.

Examples of the (meth)acrylic acid ester in which the alkyl group in the ester portion has 1 to 20 carbon atoms include methyl (meth)acrylate, ethyl (meth)acrylate, propyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate and stearyl (meth)acrylate. The above compound may be used singly or in combination of two or more.

Examples of the monomer having a functional group having active hydrogen include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate and 4-hydroxybutyl (meth)acrylate; monoalkylaminoalkyl (meth)acrylates such as monomethylaminoethyl (meth)acrylate, monoethylaminoethyl (meth)acrylate, monomethylaminopropyl (meth)-acrylate and monoethylaminopropyl (meth)acrylate; and ethylenically unsaturated carboxylic acids such as acrylic acid, methacrylic acid, crotonic acid, maleic acid, itaconic acid and citraconic acid. The above monomer may be used singly or in combination of two or more.

Examples of the other monomer which is used where desired include vinyl esters such as vinyl acetate and vinyl propionate; olefins such as ethylene, propylene and isobutylene; halogenated olefins such as vinyl chloride and vinylidene chloride; styrene-based monomers such as styrene and α-methylstyrene; diene-based monomers such as butadiene, isoprene and chloroprene; nitrile-based monomers such as acrylonitrile and methacrylonitrile; and acrylamides such as acrylamide, N-methyl-acrylamide and N,N-dimethylacrylamide. The above compound may be used singly or in combination of two or more.

The copolymer form of the (meth)acrylic acid ester-based copolymer used as the resin component in the acrylic pressure sensitive adhesive is not particularly limited and may be any of a random copolymer, a block copolymer or a graft copolymer. It is preferable that the molecular weight is in the range of 500,000 to 2,000,000 as the weight-average molecular weight.

The weight-average molecular weight described above is the value expressed as the weight-average molecular weight of the corresponding standard polymethyl methacrylate obtained by the measurement of the gel permeation chromatography (GPC). The weight-average molecular weight is measured under the following condition throughout the present invention:

Solvent for elution: tetrahydrofuran (THF)
Temperature: 40° C.
Columns:
the first column: TSKgel GMHXL
the second column: TSKgel GMHXL
the third column: TSKgel 2000HXL
(The solvent flows through the first column, the second column and the third column successively in this order.)
Flow rate: 1 ml/minute
Detector: a differential refractometer In the present invention, the (meth)acrylic ester-based copolymer may be used singly or in combination of two or more.

The crosslinking agent in the acrylic pressure sensitive adhesive is not particularly limited, and a suitable crosslinking agent can be selected from crosslinking agents conventionally used as the crosslinking agent in acrylic pressure sensitive adhesives such as polyisocyanate compounds, epoxy resins, aziridine-based compounds, melamine resins, urea resins, dialdehydes, methylol polymers, metal chelate compounds, metal alkoxides and metal salts. Among the above crosslinking agents, metal chelate compounds and aziridine-based compounds are preferable since change in the transmittance of light due to change in the color (yellowing) of the pressure sensitive adhesive is suppressed and change in the properties due to irradiation with laser is also suppressed.

The metal chelate compound is not particularly limited, and a compound can be suitably selected as desired from compounds conventionally used as the metal chelate-based compound in acrylic pressure sensitive adhesives. Examples of the metal chelate-based compound include chelate compounds having aluminum, zirconium, titanium, zinc, iron or tin as the metal atom. Aluminum chelate compounds are preferable from the standpoint of the properties.

Examples of the aluminum chelate compound include diisopropoxy aluminum monooleyl acetoacetate, monoisopropoxy aluminum bisoleylacetoacetate, monoisopropoxy aluminum monooleate monoethyl acetoacetate, diisopropoxy aluminum monolauryl acetoacetate, diisopropoxy aluminum monostearyl acetoacetate, diisopropoxy aluminum monoisostearylacetoacetate, monoisopropoxy aluminum mono-N-lauroyl-β-alanate monolauryl acetoacetate, aluminum trisacetylacetonate, monoacetylacetonato aluminum bis(isobutyl acetoacetate) chelate, monoacetylacetonato aluminum bis(2-ethylhexyl acetoacetate) chelate, monoacetylacetonato aluminum bis(dodecyl acetoacetate) chelate and monoacetylacetonato aluminum bis(oleyl acetoacetate) chelate.

The aziridine-based compound is not particularly limited, and a compound can be suitably selected as desired from compounds conventionally used as the aziridine-based compounds in acrylic pressure sensitive adhesives. Examples of the aziridine-based compound include trimethylolpropane tri (2-methyl-1-aziridinepropionate), 4,4'-bis(ethylene-iminocarbonylamino)diphenylmethane, tetramethylolmethane tri-β-aziridinylpropionate, 2,2'-bishydroxymethylbutanol tris[3-(1-aziridinyl)-propionate], 1,6-hexamethylenediethyleneurea, diphenylmethane bis-4,4'-N,N'-diethyleneurea.

In the present invention, the metal chelate compound and the aziridine-based compound may be used singly or in combination of two or more. The contents are selected, in general, in the range of 0.01 to 5.0 parts by mass, preferably in the range of 0.05 to 3.0 parts by mass and more preferably in the range of 0.1 to 1.0 part by mass based on 100 parts by mass of the (meth)acrylic ester-based copolymer from the standpoint of the properties as the pressure sensitive adhesive.

To the pressure sensitive adhesive, tackifiers, antioxidants, ultraviolet light absorbers, light stabilizers, softeners and fillers may be added where desired as long as the effect of the present invention is not adversely affected.

The thickness of the adhesive layer in Sheet material A of the present invention is not particularly limited. The thickness is, in general, about 1 to 100 μm and preferably 2 to 30 μm.

(Transfer Layer of the Energy Beam Curable Type)

The transfer layer of the energy beam curable type disposed in Sheet material A of the present invention is a layer for transferring the shape of a stamper having a shape having protrusions and depressions on the surface as the recording pits and/or grooves so that the positional information is contained in the multilayer optical recording medium. The transfer layer of the energy beam curable type can be formed using a macromolecular material of the energy beam curable type.

In the present invention, the macromolecular material of the energy beam curing type means a macromolecular material which is crosslinkable by irradiation with a beam having energy quantum among electromagnetic waves and charged particles such as ultraviolet light and electron beams.

Examples of the macromolecular material of the energy beam curing type used in the present invention include (1) macromolecular materials comprising an acrylic polymer, a polymerizable oligomer and/or a polymerizable monomer of the energy beam curing type and, where desired, a photopolymerization initiator and (2) macromolecular materials comprising an acrylic polymer in which a functional group of the energy beam curing type having a polymerizable unsaturated group is introduced into side chains and, where desired, a photopolymerization initiator.

In the macromolecular material described in (1), preferable examples of the acrylic polymer include copolymers of a (meth)acrylic acid ester in which the alkyl group in the ester portion has 1 to 20 carbon atoms and, where desired, a monomer having a functional group having active hydrogen and other monomers, i.e., (meth)acrylic acid ester-based copolymers.

The acrylic polymer include copolymers of a (meth)acrylic acid ester in which the alkyl group in the ester portion has 1 to 20 carbon atoms, the monomer having a functional group having active hydrogen and other monomers are as described above in the description for the acrylic pressure sensitive adhesive.

The (meth)acrylic acid ester-based copolymer contains, in general, about 5 to 100% by mass and preferably 50 to 95% by mass of the component of the (meth)acrylic acid ester and, in general, about 0 to 95% by mass and preferably 5 to 50% by mass of the component of the monomer having a functional group having active hydrogen. About 0 to 30% by mass of the other monomers may be contained.

In the macromolecular material, the copolymer form of the (meth)acrylic acid ester-based copolymer used as the acrylic polymer is not particularly limited and may be any of a random copolymer, a block copolymer or a graft copolymer. It is preferable that the molecular weight is 50,000 or greater as the weight-average molecular weight.

In the present invention, the (meth)acrylic acid ester-based copolymer may be used singly or in combination of two or more Examples of the polymerizable oligomer of the energy beam curing type include polyester acrylate-based oligomers, epoxy acrylate-based oligomers, urethane acrylate-based oligomers, polyether acrylate-based oligomers, polybutadiene acrylate-based oligomers and silicone acrylate-based oligomers. The polyester acrylate-based oligomer can be obtained, for example, by esterification with (meth)acrylic acid of hydroxyl group in a polyester oligomer having hydroxyl group at both ends which is obtained by condensation of a polybasic carboxylic acid and a polyhydric alcohol, or by esterification with (meth)acrylic acid of hydroxyl group at the ends of an oligomer which is obtained by addition of an alkylene oxide to a polybasic carboxylic acid. The epoxy acrylate-based oligomer can be obtained, for example, by esterification by reaction of (meth)acrylic acid with the oxirane ring in an epoxy resin of the bisphenol type or an epoxy resin of the novolak type having a relatively small molecular weight. Epoxy acrylate oligomers of the carboxyl modification type which are obtained by partial modification of the epoxy acrylate-based oligomer described above with an anhydride of a dibasic carboxylic acid can also be used. The urethane acrylate-based prepolymer can be obtained, for example, by esterification with (meth)acrylic acid of a polyurethane oligomer which is obtained by the reaction of a polyether polyol or a polyester polyol with a polyisocyanate. The polyol acrylate-based oligomer can be obtained, for example, by esterification with (meth)acrylic acid of hydroxyl group in a polyether polyol.

It is preferable that the weight-average molecular weight of the polymerizable oligomer is selected in the range of 500 to 100,000, more preferably in the range of 1,000 to 70,000 and most preferably in the range of 3,000 to 40,000.

The polymerizable oligomer may be used singly or in combination of two or more.

Examples of the polymerizable monomer of the energy beam curing type include monofunctional acrylates such as cyclohexyl (meth)acrylate, 2-ethylhexyl (meth)acrylate, lauryl (meth)acrylate, stearyl (meth)acrylate and isobornyl (meth)acrylate; and polyfunctional acrylates such as 1,4-butanediol di(meth) acrylate, 1,6-hexanediol di(meth)acrylate, neopentyl glycol di(meth)acrylate, polyethylene glycol di(meth)acrylate, neopentyl glycol adipate di(meth)acrylate, hydroxypivalic acid neopentyl glycol di(meth)acrylate, dicyclopentanyl di(meth)acrylate, dicyclopentenyl di(meth)acrylate modified with caprolactone, phosphoric acid di(meth)-acrylate modified with ethylene oxide, cyclohexyl di(meth) acrylate modified with allyl group, isocyanurate di(meth) acrylate, dimethyloltricyclodecane di(meth)acrylate, trimethylolpropane tri(meth)acrylate, dipentaerythritol tri (meth)acrylate, dipentaerythritol tri(meth)acrylate modified with propionic acid, pentaerythritol tri(meth)acrylate, trimethylolpropane tri(meth)acrylate modified with propylene oxide, tris(acryloxyethyl) isocyanurate, dipentaerythritol penta(meth)acrylate modified with propionic acid, dipentaerythritol hexa(meth)acrylate and dipentaerythritol hexa (meth)acrylate modified with caprolactone. The polymerizable monomer may be used singly or in combination of two or more.

The amount of the polymerizable oligomer and the polymerizable monomer is, in general, about 3 to 400 parts by mass based on 100 parts by mass of the solid components in the (meth)acrylic ester-based polymer.

As the energy beam, in general, ultraviolet light or electron beams are used for irradiation. When ultraviolet light is used, a photopolymerization initiator can be used. Examples of the photopolymerization initiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy -2-phenylacetophenone, 2,2-dimethoxy-1,2-diphenylethan-1-one, 2,2-diethoxy-2-phenylacetophenone, 2-hydroxy-2-methyl-1-phenyl-propan-1-one, 1-hydroxycyclohexyl phenyl ketone, 2-methyl-1-[4-(methyl-thio)phenyl]-2-morpholinopropan-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylamine benzoic acid ester and oligo[2-hydroxy-2-methyl-1-[4-(1-propenyl)phenyl]-propanone]. The above compound may be used singly or in combination of two or more.

The amount is, in general, about 0.1 to 10 parts by mass based on 100 parts by mass of the solid components in the macromolecular material of the energy beam curing type.

In the macromolecular material described in (2), examples of the acrylic polymer in which a functional group of the energy beam curing type having a radical polymerizable unsaturated group is introduced in side chains include acrylic polymers obtained by introducing a functional group of the energy beam curing type having a radical polymerizable unsaturated group into the side chain of the acrylic polymer described above for the macromolecular material of (1). The functional group of the energy beam curing type having a radical polymerizable unsaturated group can be introduced into the side chains by introducing an active point such as —COOH, —NCO, epoxy group, —OH and —NH$_2$ into the polymer chain of the acrylic polymers, followed by reacting the active point with a compound having a radical polymerizable unsaturated group.

The active point described above can be introduced by making a functional group such as —COOH, —NCO, epoxy group, —OH and —NH$_2$ and a monomer or an oligomer having a radical polymerizable unsaturated group coexist in a reaction system when the acrylic polymer is produced.

Specifically, when the acrylic polymer described in the macromolecular material of (1) is produced, for example, (meth)acrylic acid can be used for introducing —COOH group, 2-(meth)acryloyloxyethyl isocyanate can be used for introducing —NCO group, glycidyl (meth)acrylate can be used for introducing epoxy group, 2-hydroxyethyl (meth) acrylate or 1,6-hexanediol mono(meth)acrylate can be used for introducing —OH group, and N-methyl(meth)acrylamide can be used for introducing —NH$_2$ group.

As the compound having a radical polymerizable unsaturated group which is brought into reaction with the active point, a compound can be suitably selected in accordance with the type of the active point, for example, from 2-(meth)

acryloxyethyl isocyanate, glycidyl (meth)acrylate, pentaerythritol mono(meth)acrylate, dipentaerythritol mono(meth)acrylate and trimethylolpropane mono(meth)acrylate.

The (meth)acrylic acid ester-based copolymer, which is the acrylic polymer obtained by introducing a functional group of the energy beam curing type having a radical polymerizable unsaturated group at side chains of the acrylic polymer via the active point described above, can be obtained as described above.

It is preferable that the (meth)acrylic acid ester-based copolymer in which a functional group of the energy beam curing type is introduced has a weight-average molecular weight of 100,000 or greater and more preferably 300,00 or greater.

As the photopolymerization initiator which is used where desired, the photopolymerization initiators described above as the examples of the photopolymerization initiator in the description of the macromolecular material of (1) can be used.

In Sheet material A of the present invention, the thickness of the transfer layer of the energy beam curable type is, in general, about 2 to 50 μm and preferably 3 to 30 μm.

(Transparent Resin Layer)

It is preferable that a transparent resin layer is disposed in Sheet material A of the present invention. By disposing the transparent resin layer, the sheet material is reinforced and, as the result, formation of wrinkles in the optical recording layer can be suppressed in the preparation of the multilayer structural body and the multilayer optical recording medium of the present invention. Interpenetration of the optical recording layer and the transfer layer of the energy beam curable type can be prevented by disposing the transparent layer between these layers.

The material for the transparent resin layer is not particularly limited as long as the material is transparent, effectively exhibits the reinforcing effect and does not adversely affect the optical properties of the sheet material of the present invention. Examples of the material described above include triacetylcellulose, polycarbonate resins, cycloolefin-based resins, modified acrylic resins, cured products of photopolymerizable oligomers, polyvinyl alcohol, polyimides, polyether imides, polysulfones, polyether sulfones, polyarylates and polyesters such as polyethylene terephthalate. Materials exhibiting suppressed birefringence are preferable among these materials. Specifically, triacetylcellulose, polyethylene terephthalate, cycloolefin-based resins and polycarbonate resins are preferable.

In the present invention, the transparent resin layer may be formed using the above resin material in the film form or formed in accordance with a coating process using a coating composition comprising the resin material described above.

In the present invention, from the standpoint of the effect of reinforcing the sheet material and the reliability as the optical recording medium, it is preferable that the transparent resin layer comprising the material described above has a glass transition temperature of 50° C. or higher, more preferably 60° C. or higher and most preferably 70 to 250° C. and an elongation at break smaller than 300%, preferably 250% or smaller and most preferably 1 to 200%. It is preferable that the thickness is 1 to 100 μm, more preferably 2 to 90 μm and most preferably 2 to 80 μm from the standpoint of exhibiting the reinforcing effect, preventing formation of wrinkles and obtaining the practical density of recording.

In the present invention, the glass transition temperature and the elongation at break of the transparent resin layer are measured in accordance with the following method.

Glass Transition Temperature

In accordance with the method of Japanese Industrial Standard K 7121, the extrapolated temperature of start of transition is measured using an input compensation differential scanning colorimeter in the range of the temperature of −80 to 250° C. and the obtained result is used as the transition temperature (Tg).

Elongation at Break

In accordance with the methods of Japanese Industrial Standards K 7161 and K 7127, using as the test piece a film having the same thickness as that of the transparent resin layer for the measurement, the tensile test was conducted at the test speed of 50 mm/min. When the test piece used for the test has no yield point, the tensile strain at break was used as the elongation at break. When the test piece has a yield point, the nominal tensile strain at break is used as the elongation at break.

The transparent resin layer may be subjected in advance to a surface treatment such as the treatment by an oxidation process and the treatment by a roughening process for the purpose of improving adhesion with the layer disposed on the transparent resin layer. Examples of the oxidation process include the treatment by corona discharge, the treatment with plasma, the treatment with chromic acid (the wet process), the treatment with flame, the treatment with the heated air and the treatment by exposure to ozone and ultraviolet light. Examples of the roughening process include the sand blasting process and the treatment with a solvent. The process for the surface treatment can be selected suitably in accordance with the type of the transparent resin layer. In general, the treatment by corona discharge is preferable from the standpoint of the effect and the operability.

(Preparation of Sheet Material A)

As described above, Sheet material A of the present invention has a structure in which the optical recording layer, the adhesive layer, the transfer layer of the energy beam curable type and the transparent resin layer which is disposed where desired are disposed and the transfer layer of the energy beam curable type and the adhesive layer are each disposed as the outermost layers. Release film I and II may be attached to the surface of the transfer layer of the energy beam curable type and the adhesive layer to protect the layers.

The transparent resin layer which is disposed where desired can be disposed between the adhesive layer and the optical recording layer or between the optical recording layer and the transfer layer of the energy beam curable type. From the standpoint of effectively exhibiting the function of the transparent resin layer described above, it is preferable that the transparent resin layer is disposed between the optical recording layer and the transfer layer of the energy beam curable type.

Release films I and II are not particularly limited. Examples of Release films I and II include polyolefin films such as polyethylene films and polypropylene films and films obtained by coating these polyolefin films, polyester films such as films of polyethylene terephthalate and paper such as glassin paper, coated paper and paper laminated with polyolefins with a release agent such as a silicone resin to form a layer of the release agent. Release films I and II may be the same with or different from each other. The thickness of Release films I and II is not particularly limited. In general, the thickness is about 20 to 150 μm.

FIG. 1 shows a sectional view exhibiting a construction of an embodiment of Sheet material A for a multilayer optical recording medium having release films of the present invention. Sheet material A having release films 10-a shown in FIG. 1 has a structure in which a transparent resin layer 2 and a transfer layer of the energy beam curable type 3 are successively laminated to one face of an optical recording layer 1, and an adhesive layer 4 is laminated to the other face of the optical recording layer 1. Release film I 5 for protecting the transfer layer of the energy beam curable type 3 is disposed on the surface of the transfer layer of the energy beam curable type 3. Release film II 6 for protecting the adhesive layer is disposed on the surface of the adhesive layer 4.

Figure 2:
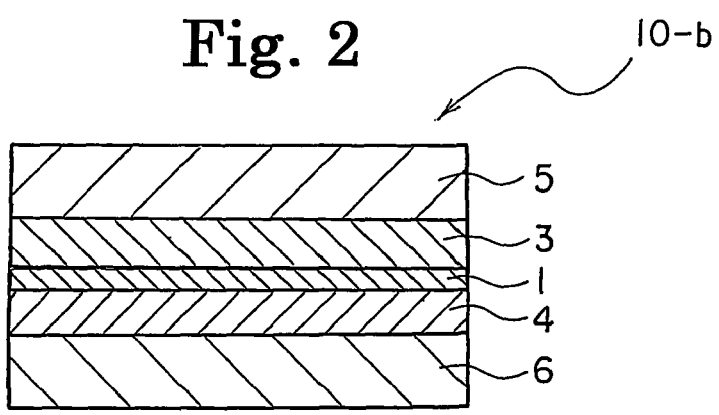
FIG. 2 shows a sectional view exhibiting a construction of another embodiment of Sheet material A for a multilayer optical recording medium of the present invention having release films.

FIG. 2 shows a sectional view exhibiting a construction of another embodiment of Sheet material A for a multilayer optical recording medium having release films of the present invention. Sheet material A having release films 10-b shown in FIG. 1 has a structure in which a transfer layer of the energy beam curable type 3 is laminated to one face of an optical recording layer 1, and an adhesive layer 4 is laminated to the other face of the optical recording layer 1. Release film I 5 for protecting the transfer layer of the energy beam curable type 3 is disposed on the surface of the transfer layer of the energy beam curable type 3. Release film II 6 for protecting the adhesive layer 4 is disposed on the surface of the adhesive layer 4.

The process for preparing Sheet material A having release films is not particularly limited. When Sheet material A having the four-layer structure, which is the construction shown in FIG. 1, is prepared, the following process can be used.

A coating solution for forming the transfer layer of the energy beam curable type (hereinafter, referred to as a coating solution for forming a transfer layer) is prepared in the first step. The coating solution for forming a transfer layer can be prepared by dissolving or dispersing the macromolecular material of the energy beam curable type described above in combination with crosslinking agents, tackifiers, antioxidants, ultraviolet light absorbers, light stabilizers, softeners and fillers which are used where desired in a suitable solvent in amounts such that the concentration is adjusted at a value suitable for the coating operation.

The coating solution for forming a transfer layer prepared as described above is applied to the layer of the release agent in Release film I in accordance with the conventional process such as the knife coating process, the roll coating process, the bar coating process, the blade coating process, the die coating process and the gravure coating process in an amount such that a coating layer having a prescribed thickness after being dried is formed. The formed coating layer is dried to form a transfer layer of the energy beam curable type, and a laminate comprising the transfer layer and Release film I is prepared.

Separately, a coating solution of an adhesive is applied to the layer of the releasing agent of Release film II in accordance with the conventional process such as the knife coating process, the roll coating process, the bar coating process, the blade coating process, the die coating process and the gravure coating process in an amount such that a coating layer having a prescribed thickness after being dried is formed. The formed coating layer is dried to form an adhesive layer, and a laminate comprising the adhesive layer and Release film II is prepared.

A coating solution containing the material for forming an optical recording layer in a suitable concentration is applied to one face of a resin film which forms a transparent resin layer in an amount such that a coating layer having a prescribed thickness after being dried is formed in accordance with the same procedures as those described above. The formed coating layer is dried to form an optical recording layer, and a laminate comprising the optical recording layer and the transparent resin film is prepared. To the laminate thus formed, the laminate comprising an adhesive layer and Release film II prepared above is laminated in a manner such that the optical recording layer is attached to the adhesive layer, and the laminate comprising the transfer layer and Release film I prepared above is laminated in a manner such that the transfer layer is attached to the transparent resin layer. The entire laminate thus obtained is pressed by a rubber roller or the like, and Sheet material A having a four-layer structure and having release films, which is the construction shown in FIG. 1, can be obtained.

When Sheet material A having the three-layer structure, which is the construction shown in FIG. 2, is prepared, the following process can be used.

A transfer layer of the energy beam curable type is formed on the layer of the release agent of Release film I in accordance with the same procedure as that described above, and Laminate X comprising the transfer layer and Release film I is prepared. Separately, an optical recording layer is formed on the layer of the releasing agent of a release film in accordance with the same procedure as that described above, and Laminate Y comprising the optical recording layer and the release film is prepared.

Separately, an adhesive layer is formed on the layer of the release agent of Release film II, and Laminate Z comprising the adhesive layer and Release film II is prepared.

Laminate Y prepared above is placed on the face of the adhesive layer of Laminate Z prepared above in a manner such that the optical recording layer of Laminate Y is attached to the adhesive layer of Laminate Z. The laminate thus formed is pressed by a rubber roller or the like, and a sheet having release films on the faces of the optical recording layer and the adhesive layer is prepared. Then, the release film on the face of the optical recording layer in the prepared sheet is peeled off. Laminate X prepared above is placed on the exposed face of the optical recording layer in a manner such that the transfer layer of Laminate X is attached to the exposed face of optical recording layer. The entire laminate thus obtained is pressed by a rubber roller or the like, and Sheet material A having release films having a three-layer structure, which is the construction shown in FIG. 2, can be obtained.

Sheet material A of the present invention obtained as described above is used as the material for producing Sheet material B for a multilayer optical recording medium and Multilayer structural bodies for an optical recording medium A and B of the present invention which are described in the following.

[Sheet Material B for a Multilayer Optical Recording Medium]

Sheet material B of the present invention is characterized in that, in Sheet material A of the present invention described above, the transfer layer of the energy beam curable type is a layer obtained by transferring the shape of a stamper having a shape having protrusions and depressions on the surface, followed by curing the layer having the transferred shape by irradiation with an energy beam.

Sheet material B can be prepared, for example, in accordance with the following process.

An embodiment in which the sheet material having a four-layer structure and having release films, which is the construction shown in FIG. 1, is used as Sheet material A will be described.

Release film I 5 in Sheet material A having release films 10-a shown in FIG. 1 is peeled off, and a transfer layer of the energy beam curable type 3 is exposed in the first step. Then, a stamper having a shape having protrusions and depressions on the surface as the pattern of recording pits and/or grooves is laminated to the transfer layer of the energy beam curable type in a manner such that the face of the stamper having a shape having protrusions and depressions is attached to the transfer layer of the energy beam curable type, and the laminate thus formed is pressed by a rubber roller or the like. Then, the transfer layer is cured by irradiation with an energy beam, and the stamper is peeled off and removed.

As the energy beam, in general, ultraviolet light or electron beams are used. Ultraviolet light is obtained from a high pressure mercury lamp, a metal halide lamp, an electrodeless lamp or a xenon lamp. Electron beams are obtained from an electron accelerator. Between these energy beams, ultraviolet light is preferable. As for the amount of the energy beam, an amount of light of 100 to 5,000 $J/cm^2$ is preferable when ultraviolet light is used, and an amount of irradiation of 10 to 1,000 krad is preferable when electron beams are used.

The transfer layer of the energy beam curable type 3 is converted into a cured transfer layer having recording pits and/or grooves formed on the surface.

Figure 3:
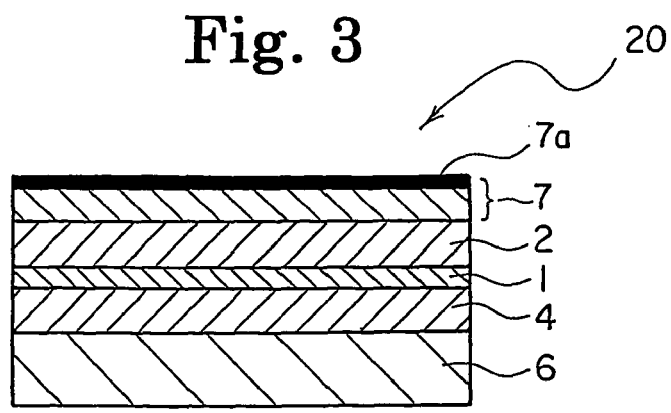
FIG. 3 shows a sectional view exhibiting a construction of an embodiment of Sheet material B for a multilayer optical recording medium of the present invention having a release film.

FIG. 3 shows a sectional view exhibiting a construction of an embodiment of Sheet material for a multilayer optical recording medium B having a release film of the present invention. Sheet material B having a release film 20 shown in FIG. 3 has a structure in which a transparent resin layer 2 and a cured transfer layer 7 having recording pits and/or grooves (positional information) 7a formed on the surface are successively laminated on one face of the optical recording layer 1, and an adhesive layer 4 and Release film II 6 are laminated on the other face of the optical recording layer 1.

Sheet material B of the present invention obtained as described above is used as the material for producing the multilayer structural body for an optical recording medium (hereinafter, referred to as a multilayer structural body, occasionally) of the present invention.

The multilayer structural body for an optical recording medium of the present invention comprises two embodiments which are Multilayer structural body A for an optical recording medium and Multilayer structural body B for an optical recording medium shown in the following.

[Multilayer Structural Body A for an Optical Recording Medium]

Multilayer structural body A of the present invention can be prepared by using Sheet material A or Sheet material B of the present invention described above. Multilayer structural body A has a structure such that a plurality of units having a three-layer structure in which a cured transfer layer having recording pits and/or grooves formed on the surface, an optical recording layer and an adhesive layer are laminated successively are laminated via the adhesive layers, or a structure such that a plurality of units having a four-layer structure in which a transparent resin layer is disposed between the cured transfer layer and the optical recording layer or between the optical recording layer and the adhesive layer in the unit having the three-layer structure described above are laminated via the adhesive layers.

In the unit having a four-layer structure, it is preferable that the transparent resin layer is disposed between the cured transfer layer and the optical recording layer as described for the transparent resin layer in the above.

In Multilayer structural body A, the recording pits and/or grooves (the positional information) are formed in all units in the laminate.

The number of the unit laminated in Multilayer structural body A of the present invention is not particularly limited. The number is, in general, about 2 to 200 and preferably 3 to 100. When the number of the unit is one, the sufficient density of recording is not obtained. When the number of the unit exceeds 200, there is the possibility that problems arise in writing and reading information due to absorption of light in the layers and reflection of light at the interface of layers.

Figure 4:
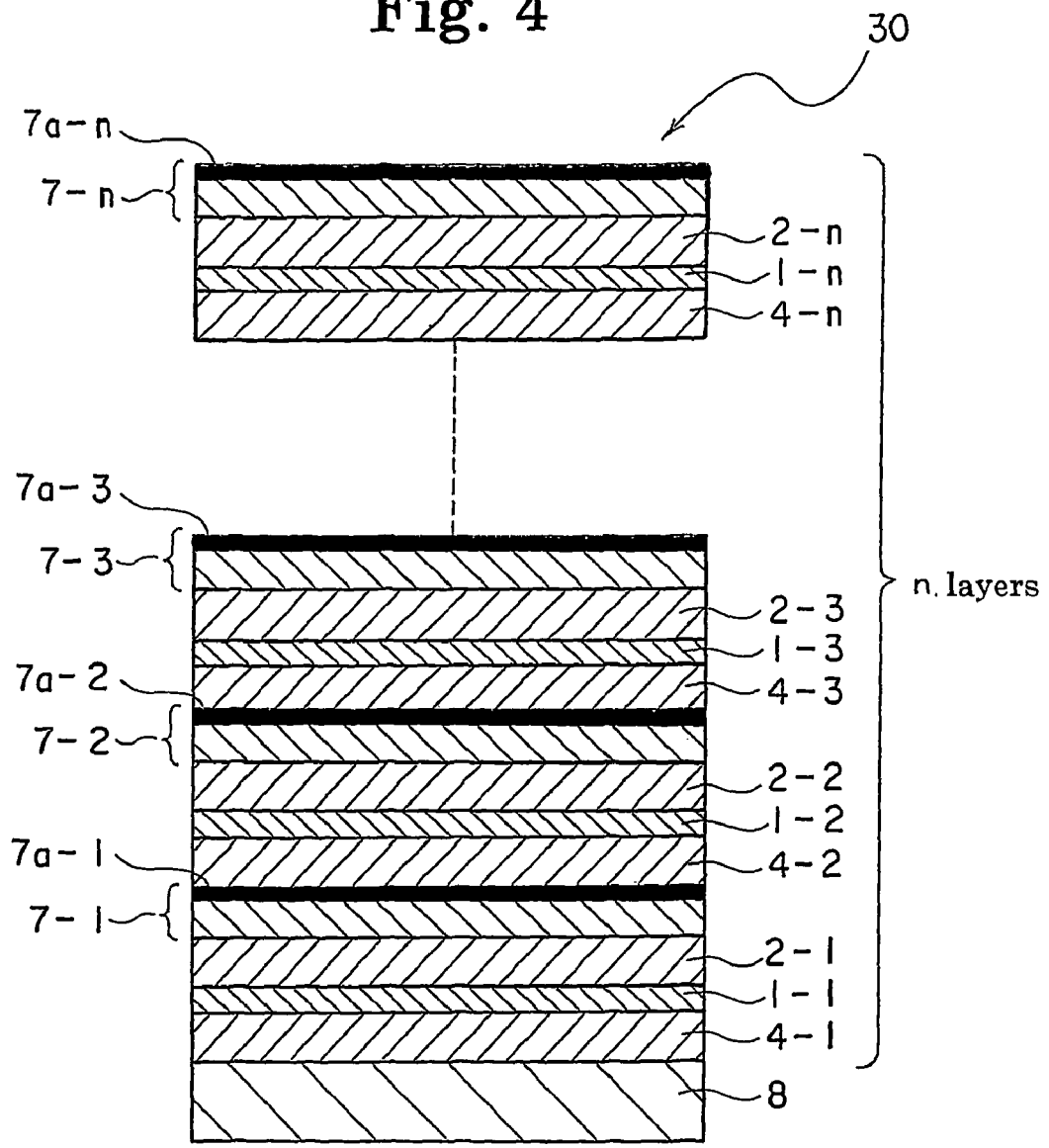
FIG. 4 shows a sectional view exhibiting a construction of an embodiment of Multilayer structural body A of the present invention.

FIG. 4 shows a sectional view exhibiting a construction of an embodiment of Multilayer structural body A of the present invention. Multilayer structural body A 30 has a structure in which n layers of a unit having the four-layer structure comprising an adhesive layer, an optical recording layer, a transparent resin layer and a cured transfer layer having recording pits and/or grooves formed on the surface (hereinafter, referred to as a cured transfer layer, occasionally) are laminated on a substrate 8 such as a polymethyl methacrylate film, and an adhesive layer 4-1, an optical recording layer 1-1, a transparent resin layer 2-1, a cured transfer layer 7-1, an adhesive layer 4-2, an optical recording layer 1-2, a transparent resin layer 2-2, a cured transfer layer 7-2, n adhesive layer 4-3, an optical recording layer 1-3, a transparent resin layer 2-3, a cured transfer layer 7-3 . . . an adhesive layer 4-n, an optical recording layer 1-n, a transparent resin layer 2-n and a cured transfer layer 7-n are disposed.

Multilayer structural body A 30 having the above structure can be prepared by using Sheet material A or Sheet material B of the present invention, for example, as described in the following. The process for preparing Multilayer structural body A 30 using Sheet material A 10-a having release films shown in FIG. 1 will be described in the following.

From Sheet material A 10-a having release films shown in FIG. 1, Release film II 6 is peeled off, and a substrate 8 is laminated to Sheet material A in a manner such that the substrate 8 is faced to the exposed adhesive layer 4 as shown in FIG. 4. Release film I 5 is peeled off, and the transfer layer of the energy beam curable type 3 is exposed. Then, a stamper having a shape having protrusions and depressions on the surface as recording pits and/or grooves is laminated to the laminate obtained above in a manner such that the surface having a shape having protrusions and depressions is faced to the exposed transfer layer of the energy beam curable type, and the laminate thus formed is pressed by a rubber roller or the like. The transfer layer is cured by irradiation with an energy beam and, then, the stamper is peeled off and removed. The energy beam is as described in the above. As described above, the transfer layer of the energy beam curable type is converted into a cured transfer layer having recording pits and/or grooves formed on the surface.

Then, the procedures described above are repeated on the cured transfer layer having recording pits and/or grooves formed on the surface formed in the above, and Multilayer structural body A 30 in which n layers of the optical recording layers are laminated can be obtained.

A process for preparing Multilayer structural body A 30 using Sheet material B 20 having a release film shown in FIG. 3 will be described in the following.

From Sheet material B 20 having a release film shown in FIG. 3, Release film II 6 is peeled off, and a substrate 8 is laminated to a first Sheet material A in a manner such that the substrate 8 is faced to the exposed adhesive layer 4 as shown in FIG. 4. Then, Release film II 6 is peeled off from a second Sheet material B 20 having a release film, and the second Sheet material B is laminated to the cured transfer layer 7-1 in a manner such that the exposed adhesive layer in the second Sheet material B is faced to the cured transfer layer as shown in FIG. 4. The same procedures as those described above are repeated successively, and Multilayer structural body A 30 in which n layers of the optical recording layer are laminated can be obtained.

[Multilayer Structural Body B for an Optical Recording Medium]

Multilayer structural body B of the present invention is characterized in that Multilayer structural body B has a repetitive structure in which a plurality of units comprising at least an optical recording unit comprising a material absorbing multiple photons and an adhesive layer are laminated via the adhesive layer, and that at least one Sheet material A' of the present invention or at least one Sheet material B of the present invention described above, which has a cured transfer layer having recording pits and/or grooves formed on the surface, is disposed between the units. Sheet material A' means Sheet material A in which the transfer layer has been converted into a cured transfer layer having recording pits and/or grooves formed on the surface.

In Multilayer structural body B, a laminate sheet at least comprising an optical recording layer comprising a multiple-photon absorbing material and an adhesive layer is used as the unit constituting the repetitive structure. As the laminate sheet, for example, a laminate sheet having a two-layer structure comprising an optical recording layer and an adhesive layer or a laminate sheet having a three-layer structure in which a transparent resin layer, an optical recording layer and an adhesive layer are successively laminated or an optical recording layer, a transparent resin layer and an adhesive layer are successively laminated can be used. A laminate sheet having a three-layer structure comprising a transparent resin layer is preferable from the standpoint of suppressing formation of wrinkles in the preparation of the multilayer structural body.

Multilayer structural body B is a multilayer structural body in which a plurality of units are laminated, and at least one Sheet material A' of the present invention which has a cured transfer layer having recording pits and/or grooves formed on the surface, or at least one Sheet material B of the present invention described above is disposed between the units. The position where Sheet material A' or Sheet material B is disposed is not particularly limited, and the sheet may be suitably disposed at the necessary position. For example, Sheet material A' or Sheet material B may be disposed at the lowermost layer (the unit adjacent to the substrate 8) alone or at the uppermost layer alone or may be disposed in a manner such that one unit in every set of a plurality of units is Sheet material A' or Sheet material B.

Figure 5:
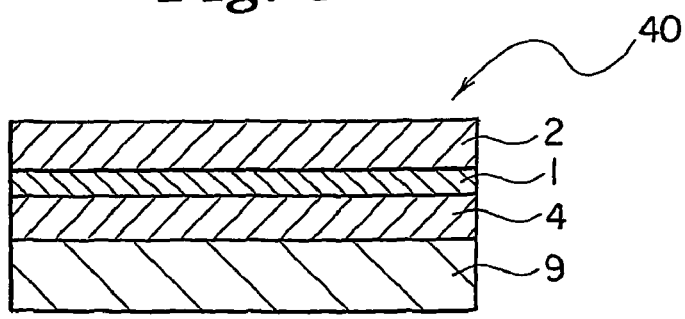
FIG. 5 shows a sectional view exhibiting an example of a laminate sheet having a three layer structure and having a release film which is used for preparing Multilayer structural body B of the present invention.
Figure 6:
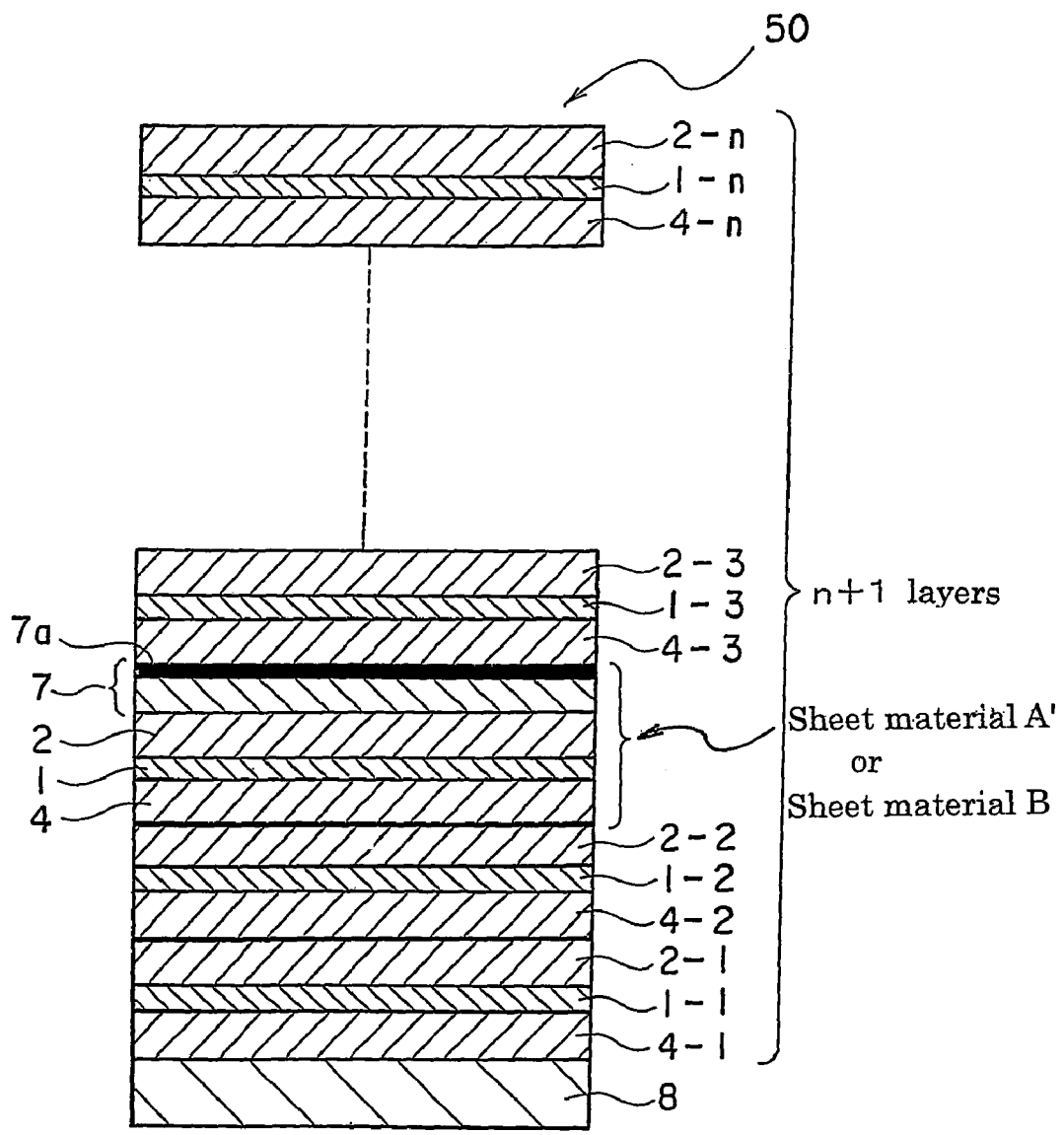
FIG. 6 shows a sectional view exhibiting a construction of an embodiment of Multilayer structural body B of the present invention.

FIG. 5 shows a sectional view exhibiting an example of the laminate sheet which has a three layer structure having a release film which is used for preparing Multilayer structural body B of the present invention shown in FIG. 6. The laminate sheet 40 which has a three-layer structure having a release sheet which is shown in FIG. 5 has a three-layer structure in which a transparent resin layer 2 and an adhesive layer 4 are disposed via an optical recording layer 1, and a release film 9 is attached to the adhesive layer 4.

FIG. 6 shows a sectional view exhibiting an embodiment of the construction of Multilayer structural body B of the present invention. In the embodiment shown in FIG. 6, one Sheet material A' of the present invention which has a cured transfer layer having recording pits and/or grooves formed on the surface or one Sheet material B of the present invention is disposed between the units. Multilayer structural body B described above has a structure in which n layers of a unit having a three-layer structure comprising an adhesive layer, an optical recording layer and a transparent resin layer are laminated on a substrate 8 such as a polymethyl methacrylate film; an adhesive layer 4-1, an optical recording layer 1-1, a transparent resin layer 2-1, an adhesive layer 4-2, an optical recording layer 1-2, a transparent resin layer 2-2, an adhesive layer 4-3, an optical recording layer 1-3, a transparent resin layer 2-3, . . . , an adhesive layer 4-n, an optical recording layer 1-n and a transparent resin layer 2-n are disposed; and Sheet material A' or Sheet material B comprising an adhesive layer 4, an optical recording layer 1, a transparent resin layer 2 and a cured transfer layer 7 having recording pits and/or grooves 7a formed on the surface is disposed between the transparent resin layer 2-2 and the adhesive layer 4-3.

Multilayer structural body B 50 having the structure described above can be prepared, for example, as shown in the following. As the first step, the release film 9 is peeled off from the laminate sheet has the three layer structure 40 and having a release film as shown in FIG. 5. The laminate sheet is attached to the substrate 8 in a manner such that the exposed adhesive layer 4 and the substrate 8 are faced to each other as shown in FIG. 6 so that an adhesive layer 4-1, an optical recording layer 1-1 and a transparent resin layer 2-1 are successively disposed on the substrate 8. Then, by repeating the same procedure as that described above, an adhesive layer 4-2, an optical recording layer 1-2 and a transparent resin layer 2-2 are successively disposed on the transparent resin layer 2-1.

Then, two procedures shown in the following are conducted.

As the first procedure, Releasing film II 6 is peeled off from Sheet material A having release films 10-a shown in FIG. 1, and Sheet material A is attached to the laminate prepared above in a manner such that the exposed adhesive layer 4 is faced to the transparent resin layer 2-2 as shown in FIG. 6. Then, the release film I 5 is peeled off, and the transfer layer of the energy beam curable type 3 is exposed. A stamper having a shape having protrusions and depressions on the surface as recording pits and/or grooves is superposed to the laminate having the exposed transfer layer in a manner such that the face of the stamper having a shape having protrusions and depressions on the surface is attached to the exposed transfer layer of the energy beam curable type. After the resultant laminate is pressed by a rubber roller or the like, the obtained laminate is irradiated with an energy beam to cure the transfer layer. Then, the stamper is peeled off and removed. The energy beam is as described above. The transfer layer of the energy beam curable type 3 is converted into a cured transfer layer 7 having recording pits and/or grooves 7a formed on the surface.

Then, using the laminate sheet 40 which has the three-layer structure having a release film which is shown in FIG. 5, lamination is repeated on the cured transfer layer 7 having recording pits and/or grooves 7a formed on the surface in accordance with the same procedures as those described above, and Multilayer structural body B 50 in which n+1 optical recording layers are laminated is obtained.

As the second procedure, Release film II 6 is peeled off from Sheet material B 20 having a release film which is shown in FIG. 3. Sheet material B 20 having the exposed adhesive layer 4 is attached to a portion of the laminate shown in FIG. 6 in a manner such that the exposed adhesive layer 4 of Sheet material B is faced to the transparent resin layer 2-2 in FIG. 6, and Sheet material B in which an adhesive layer 4, an optical recording layer 1, a transparent resin layer 2 and a cured transfer layer having pits and/or grooves (the positional information) 7a formed on the surface are disposed on the transparent resin layer 2-2 is formed. Using the laminate sheet 40 which has the three layer structure having a release film which is shown in FIG. 5, lamination is repeated on the recording pits and/or grooves formed on the surface of the cured transfer layer 7 in Sheet material B in accordance with the same procedures as those described above, and Multilayer structural body B 50 in which n+1 optical recording layers are laminated is obtained.

The thickness of the substrate 8 is not particularly limited, The thickness is, in general, about 5 to 100 μm and preferably 5 to 30 μm. Examples of the material for the substrate 8 include polymethyl methacrylate, polycarbonates, polyethylene terephthalate, polyolefins and glass.

The present invention also provides a multilayer optical medium which is characterized in that the medium comprises the multilayer structural body described above (Multilayer structural body A or Multilayer structural body B).

The method for recording and reading information in the multilayer optical recording media of the present invention is not particularly limited, and a suitable method can be selected as desired from conventional methods for recording and reading information in multilayer optical recording media.

The form of the multilayer recording media of the present invention is not particularly limited, and any of the disk form and the roll form can be used.

EXAMPLES

The present invention will be described more specifically with reference to examples in the following. However, the present invention is not limited to the examples.

The glass transition temperature and the elongation at break of a transparent resin layer were measured in accordance with the following methods.

(1) Glass Transition Temperature of a Transparent Resin Layer

In accordance with the method of Japanese Industrial Standard K 7121, the extrapolated temperature of start of glass transition was measured using an input compensation differential scanning colorimeter [manufactured by PERKIN ELMER Company; the name of the apparatus: "PYRISL DSG"] in the range of the temperature of −80 to 250° C. and the obtained result was used as the transition temperature (Tg).

(2) Elongation at Break of a Transparent Resin Layer

In accordance with the methods of Japanese Industrial Standards K 7161 and K 7127, using as the test piece a film having the same thickness as that of the transparent resin layer for the measurement, the tensile test was conducted at a test speed of 50 mm/min. When the test piece used for the test had no yield point, the strain at break was used as the elongation at break. When the test piece had a yield point, the nominal tensile strain at break was used as the elongation at break.

Example 1

Preparation of Sheet Material A for a Multilayer Optical Recording Medium Having a Release Sheet To an ethyl acetate/methyl ethyl ketone solution (the ratio of the amounts by mass: 50/50) which contained an n-butyl acrylate/methyl methacrylate/2-hydroxyethyl acrylate copolymer (the ratio of the amounts by mass of the components: 53/20/28) in an amount of 35% as the concentration of the solid components, 33.7 parts by mass (90 equivalents per 100 equivalents of the 2-hydroxyethyl acrylate component in the copolymer) of 2-methacryloxyethyl isocyanate and 0.1 part by mass of dibutyltin dilaurate as the catalyst, each based on 100 parts by mass of the solid components in the copolymer solution, were added. The reaction was allowed to proceed in the resultant mixture under the atmosphere of nitrogen at the room temperature for 48 hours, and a solution of a copolymer of the energy beam curing type (the weight-average molecular weight: 780,000) in which methacryloyl group as the energy beam curable functional group was introduced in side chains was obtained. To the solution obtained above, 3 parts by mass of 2,2-dimethoxy-1,2-diphenylethan-1-one [manufactured by CIBA Japan K. K.; the trade name: "IRGACURE 651"] as the photopolymerization initiator based on 100 parts by mass of the solid components in the obtained solution was added. Then, methyl ethyl ketone was added in an amount such that the concentration of the solid components was adjusted at 35% by mass, and a coating solution for forming a transfer layer of the energy beam curable type (A1) was prepared.

Then, the coating solution for forming a transfer layer of the energy beam curable type (A1) was applied to the surface of the layer having a release agent of a release film obtained by forming a layer of a silicone-based release agent on one face of a polyethylene terephthalate (PET) film having a thickness of 38 μm [manufactured by LINTEC Corporation; the trade name: "SP-PET382010"] by a knife coater. The resultant coating layer was dried at 90° C. for 1 minute to form a transfer layer of the energy beam curable type having a thickness of 20 μm, and a release film having an uncured transfer layer was prepared.

Then, to the surface of the layer having a release agent of a release film obtained by forming a layer of an alkyd-based release agent on one face of a polyethylene terephthalate (PET) film having a thickness of 38 μm [manufactured by LINTEC Corporation; the trade name: "SP-PET38AL-5"], a coating solution of a material for forming an optical recording layer (B1) obtained by dissolving 1 g of a diarylethene-based photochromic coloring matter [manufactured by TOKYO CHEMICAL INDUSTRY Co., Ltd.; the trade name: "B15361"] as the multiple-photon absorbing compound and 1 g of polymethyl methacrylate [manufactured by SIGMA-ALDRICH Corporation; the weight-average molecular weight: 996,000] as the matrix material into 25 g of toluene was applied by a gravure coater. The resultant coating layer was dried at 90° C. for 1 minute to form an optical recording layer having a thickness of 1 μm, and a release film having an optical recording layer was prepared.

Then, to the surface of the layer having a release agent of a release film obtained by forming a layer of a silicone-based release agent on one face of a polyethylene terephthalate (PET) film having a thickness of 50 μm [manufactured by LINTEC Corporation; the trade name: "SP-PET 501031"], a coating solution (C1) obtained by adding 4 parts by mass of an aluminum chelate-based crosslinking agent having a concentration of the solid components of 5% by mass [manufactured by SOKEN CHEMICAL AND ENGINEERING Co., Ltd.; the trade name: "M-5A"] to 100 parts by mass of an ethyl acetate solution containing 30% by mass of an n-butyl acrylate/acrylic acid copolymer (the ratio of the amounts of the components by mass: 97/3) as the solid component was applied by a knife coater. The resultant coating layer was dried at 90° C. for 1 minute, and a release film having a pressure sensitive adhesive layer having a thickness of 10 μm was prepared.

Then, the release film having an optical recording layer was disposed on the release film having a pressure sensitive adhesive layer in a manner such that the optical recording layer comes in contact with the pressure sensitive adhesive layer, and the two films were adhered together by pressing between two rubber rollers, and a sheet having release films on both faces was obtained.

The release film at the side of the optical recording layer was peeled off from the sheet obtained above. The transfer layer of the energy beam curable type of the release film having an uncured transfer layer described above was disposed on the sheet from which the release film was peeled off in a manner such that the transfer layer of the energy beam curable type comes in contact with the optical recording layer, and was adhered to the sheet by pressing between two rubber rollers. Thus, Sheet material A for a multilayer optical recording medium in which the transfer layer of the energy beam curable type, the optical recording layer and the pressure sensitive adhesive layer were laminated, and release films were disposed at the outsides of the transfer layer of the energy beam curable type and the pressure sensitive adhesive layer, was obtained.

Example 2

Preparation of Sheet Material A for a Multilayer Optical Recording Medium Having a Release Sheet To an ethyl acetate solution which contained an n-butyl acrylate/acrylic acid copolymer (the ratio of the amounts by mass of the components: 90/10; the weight-average molecular weight: about 500,000) in an amount of 35% as the concentration of the solid components, 50 parts by mass of dimethyloltricyclodecane diacrylate [manufactured by KYOEISHA CHEMICAL Co., Ltd.; the trade name: "LIGHT ACRYLATE DCP-A"] as the polymerizable monomer of the energy beam curing type, 20 parts by mass of an epoxyacrylate having a skeleton structure of bisphenol A [manufactured by KYOEISHA CHEMICAL Co., Ltd.; the trade name: "EPDXYESTER 3002A"], 5 parts by mass of 2,2-dimethoxy-1,2-diphenylethan-1-one [manufactured by CIBA Japan K. K.; the trade name: "IRGACURE 651"] as the photopolymerization initiator and 2 parts by mass of an aluminum chelate-based crosslinking agent [manufactured by SOKEN CHEMICAL AND ENGINEERING Co., Ltd.; the trade name: "M-5A"] (0.1 part by mass as the solid components), each based on 100 parts by mass of the solid components in the copolymer solution, were added. Then, methyl ethyl ketone was added in an amount such that the concentration of the solid components was adjusted at 35% by mass, and a coating solution for forming a transfer layer of the energy beam curable type (A2) was prepared.

Then, the coating solution for forming a transfer layer of the energy beam curable type (A2) prepared above was applied to surface of the layer having a release agent of a release film obtained by forming a layer of a silicone-based release agent on one face of a polyethylene terephthalate (PET) film having a thickness of 38 μm [manufactured by LINTEC Corporation; the trade name: "SP-PET381031"] by a knife coater. The resultant coating layer was dried at 90° C. for 1 minute to form a transfer layer of the energy beam curable type having a thickness of 10 μm. A PET film having a thickness of 4.5 μm [manufactured by TORAY Co. Ltd.; the trade name: LUMIRROR F57"; the elongation at break: 96%; the glass transition temperature: 69° C.] was placed in contact with the transfer layer of the energy beam curable type. The PET film and the transfer layer of the energy beam curing type were adhered together by pressing between two rubber rollers, and a release film having the transparent resin layer and the uncured transfer layer was prepared.

Then, the other face of the PET film in the release film having the transparent resin layer and the uncured transfer layer prepared above was coated with the coating solution for forming an optical recording layer (B1) prepared in Example 1 by using a Mayer bar coater. The resultant coating layer was dried at 90° C. for 1 minute, and an optical recording layer having a thickness of about 1 μm was formed.

Separately, a pressure sensitive adhesive layer having a thickness of 10 μm was formed in accordance with the same procedures as those conducted in Example 1. The formed pressure sensitive adhesive layer was placed in contact with the optical recording layer, and the two layers were adhered together by pressing between two rubber rollers. Thus, Sheet material for a multilayer optical recording medium A in which the transfer layer of the energy beam curable type, the PET film as the transparent resin film, the optical recording layer and the pressure sensitive adhesive layer were laminated, and release films were disposed at the outsides of the transfer layer of the energy beam curable type and the pressure sensitive adhesive layer, was obtained.

Example 3

Preparation of Sheet Material for a Multilayer Optical Recording Medium A Having a Release Sheet An aqueous solution (the concentration of the solid components: 10% by mass) of a polyvinyl alcohol resin (PVA) [manufactured by NIPPON SYNTHETIC CHEMICAL INDUSTRY Co., Ltd.; the trade name: "GOSENOL T-350"] was applied to the surface of the layer having a release agent of a release film obtained by forming a layer of an alkyd-based release agent on one face of a polyethylene terephthalate (PET) film having a thickness of 38 μm [manufactured by LINTEC Corporation; the trade name: SP-PET38AL-5"] by a blade coater. The resultant coating layer was dried at 110° C. for 1 minute, and a transparent resin layer comprising PVA having a thickness of about 5 μm was formed (the elongation at break: 3.5%; the glass transition temperature: 85° C.).

In accordance with the same procedures as those conducted in Example 2, a transfer layer of the energy beam curable type having a thickness of 10 μm was formed on a release film having a thickness of 38 μm. The transfer layer of the energy beam curable type and the transparent resin layer comprising PVA prepared above were attached and adhered together by pressing between two rubber rollers.

Then, the release film on the transparent resin film was peeled off, and the coating solution for forming an optical recording layer (B1) prepared in Example 1 was applied to the exposed face of the transparent resin layer. The formed coating layer was dried at 90° C. for 1 minute, and an optical recording layer having a thickness of about 1 μm was formed.

Separately, to a toluene solution containing 35% by mass of an n-butyl acrylate/2-hydroxyethyl acrylate copolymer (the ratio of the amounts by mass of the components: 97/3; the weight-average molecular weight: about 800,000) as the concentration of the solid components, 0.4 parts by mass (0.3 parts by mass as the solid components) of a hexamethylene diisocyanate(HMDI)-based crosslinking agent [manufactured by NIPPON POLYURETHANE INDUSTRY Co., Ltd.; the trade name: "CORONATE HL"] based on 100 parts by mass of the solution of the copolymer was added, and a coating solution for forming a pressure sensitive adhesive layer (C2) was prepared. The prepared coating solution (C2) was applied to the surface of the layer having a release agent of a release film obtained by forming a layer of a silicone-based release agent on one face of a polyethylene terephthalate (PET) film having a thickness of 50 μm [manufactured by LINTEC Corporation; the trade name: "SP-PET501031"] by a knife coater. The formed coating layer was dried at 90° C. for 1 minute, and a pressure sensitive adhesive layer having a thickness of 10 μm was formed. The optical recording layer and the pressure sensitive adhesive layer formed above were attached and adhered together by pressing between two rubber rollers, and Sheet material for producing a multilayer optical recording medium A in which the transfer layer of the energy beam curable type, PVA as the transparent resin layer, the optical recording layer and the pressure sensitive adhesive layers are laminated together, and release films were disposed at the outsides of the transfer layer of the energy beam curable type and the pressure sensitive adhesive layer, was obtained.

Example 4

Preparation of Multilayer Optical Recording Media

Using Sheet material A for a multilayer optical recording medium having release films which were prepared in Examples 1, 2 and 3, procedures described in the following were conducted. Release film II in each sheet material was peeled off to expose the pressure sensitive adhesive layer. The exposed pressure sensitive adhesive layer was placed on a disk substrate made of a polycarbonate (PC) having a diameter of 12 cm and pressed to the disk by a rubber roller.

Then, Release film I was peeled off, and the transfer layer of the energy beam curable type was exposed. On the exposed transfer layer, a stamper made of nickel and having a groove pattern of DVD-RW was placed in a manner such that the face of the stamper having the shape having protrusions and depressions was attached to the exposed face of the transfer layer, and the transfer layer and the stamper were pressed together by a rubber roller. Then, using an apparatus for irradiation with ultraviolet light from a fusion H lamp as the light source [manufactured by FUSION UV SYSTEMS JAPAN, K. K.; an electrodeless lamp (using a H-bulb)], ultraviolet light was irradiated at the side of the face having the substrate of the PC disk under a luminance of 300 mW/cm$^2$ in an amount of light of 300 mJ/cm$^2$, and the transfer layer of the energy beam curable type was cured. The stamper made of nickel was removed, and the surface of the cured transfer layer was observed by a scanning proving microscope (SPM) [manufactured by SEIKO INSTRUMENTS Inc.; the name of the instrument: "SPA-300HV, SPI3800N"] in the DFM mode, and the depth of the groove D was measured. The ratio (D/H)×100 was obtained, wherein D represents the depth obtained above, and H represents the height of the groove on the stamper made of nickel measured in accordance with the same method. When the value of the ratio (D/H)×100 was 90% or greater, the result was evaluated to be good. When the value of the ratio was smaller than 90%, the result was evaluated to be poor.

On the cured transfer layer having the groove pattern of DVD-RW formed in the above, optical recording layers were formed by repeating the procedures described above. In accordance with the procedures described above, multilayer optical recording media having five optical recording layers were prepared from the sheet materials described above.

Using an optical system using a titanium sapphire femtosecond laser (the wavelength: 760 nm) as the light source, all five layers in the multilayer optical recording media prepared above were successively irradiated with the laser beams while the position of the optical recording layer was confirmed by a confocal optical system. The average intensity of the laser beam was adjusted at 40 (mW), and the time of the irradiation was adjusted at ⅛ seconds. The irradiated portions were observed with a laser beam of 633 nm using a confocal laser scanning microscope [manufactured by OLYMPUS Corporation; the name of the instrument: "FV1000"]. When the recorded marks were observed completely without crosstalk in all five layers, the result was evaluated to be good. When crosstalk was found, the result was evaluated to be poor.

The results are shown in Table 1

TABLE 1

| Type of Sheet material A | Property for transfer of shape | Property for recording and reading |
|---|---|---|
| Example 1 | good | good |
| Example 2 | good | good |
| Example 3 | good | good |

INDUSTRIAL APPLICABILITY

The sheet material for a multilayer optical recording medium of the present invention enables to produce a multilayer recording medium exhibiting excellent accuracy of thickness of each layer and the whole laminate with excellent productivity. Positional information can be contained at the inside of the optical recording medium.

The invention claimed is:

1. A sheet material for a multilayer optical recording medium which is a sheet material for preparing a multilayer optical recording medium having a repetitive structure comprising a plurality of laminated optical recording layers and comprises optical recording layers comprising a multiple-photon absorbing material, an adhesive layer and a transfer layer of an energy beam curable type, wherein the transfer layer of an energy beam curable type is a layer for transferring a shape of a stamper having protrusions and depressions on a surface as recording pits and/or grooves, and the transfer layer of an energy beam curable type and the adhesive layer are each disposed as outermost layers.

2. The sheet material for a multilayer optical recording medium according to claim 1, which further comprises a transparent resin layer.

3. The sheet material for a multilayer optical recording medium according to claim 1, wherein the transparent resin layer has a thickness of 1 to 100 mm, glass transition temperature of 50° C. or higher and an elongation at break smaller than 300%.

4. The sheet material for a multilayer optical recording medium according to claim 1, wherein an adhesive constituting the adhesive layer comprises a (meth)acrylic acid ester-based copolymer as an adhesive component.

5. A sheet material for a multilayer optical recording medium which is obtained by transferring the shape of a stamper having protrusions and depressions on a surface of the transfer layer of the energy beam curable type of the sheet material for a multilayer optical recording medium according to claim 1, followed by curing by irradiation with an energy beam.

6. A multilayer structural body for optical recording medium which comprises the sheet materials for a multilayer optical recording medium described in claim 5 laminated via the adhesive layers disposed as outermost layers of the sheet materials.

7. A multilayer structural body for optical recording medium which is a multilayer structural body for optical recording medium having a repetitive structure comprising a plurality of laminated optical recording layers, wherein the repetitive structure has a structure in which a plurality of units comprising at least an optical recording layer comprising a multiple-photon absorbing material and an adhesive layer are laminated via the adhesive layer, and at least one sheet material described in claim 5 is disposed between the units.

8. A multilayer optical recording medium which comprises the multilayer structural body described in claim 6.

9. The sheet material for a multilayer optical recording medium according to claim 2, wherein the transparent resin layer is disposed between the adhesive layer and the optical recording layer or between the optical recording layer and the transfer layer of the energy beam curable type.

10. The sheet material for a multilayer optical recording medium according to claim 2, wherein the transparent resin layer is disposed between the optical recording layer and the transfer layer of the energy beam curable type.

11. The sheet material for a multilayer optical recording medium according to claim 2, wherein the transparent resin layer comprises a resin selected from the group consisting of triacetylcellulose, a polycarbonate resin, a cycloolefin-based resin, polyvinyl alcohol and polyethylene terephthalate.

12. The sheet material for a multilayer optical recording medium according to claim 11, wherein the transparent resin layer comprises polyvinyl alcohol.

13. The sheet material for a multilayer optical recording medium according to claim 11, wherein the transparent resin layer comprises polyethylene terephthalate.

14. The sheet material for a multilayer optical recording medium according to claim 1, wherein the adhesive layer comprises a copolymer of a (meth)acrylic acid ester in which the alkyl group in the ester portion has 1 to 20 carbon atoms and a monomer having a functional group having active hydrogen.

15. The sheet material for a multilayer optical recording medium according to claim 14, wherein the (meth)acrylic acid ester is n-butyl acrylate and methyl methacrylate.

16. The sheet material for a multilayer optical recording medium according to claim 14, wherein the (meth)acrylic acid ester is n-butyl acrylate.

17. The sheet material for a mutilayer optical recording medium according to claim 15, wherein optical recording medium according to claim 15 wherein the monomer having a functional group having active hydrogen is 2-hydroxyethyl acrylate.

18. The sheet material for a multilayer optical recording medium according to claim 16, wherein the monomer having a functional group having active hydrogen is acrylic acid.

19. The sheet material for a multilayer optical recording medium according to claim 1, wherein the transfer layer of the energy beam curable type comprises a macromolecular material of the energy beam curing type selected from the group consisting of (i) a macromolecular material comprising an acrylic polymer, a polymerizable oligomer and/or a polymerizable monomer of the energy beam curing type and (ii) a macromolecular material comprising an acrylic polymer in which a functional group of the energy beam curing type having a polymerizable unsaturated group is introduced into side chains.

20. The sheet material for a multilayer optical recording medium according to claim 19, wherein the macromolecular material of the energy beam curing type defined in (i) comprises a copolymer of a (meth)acrylic acid ester in which the alkyl group in the ester portion has 1 to 20 carbon atoms.

21. The sheet material for a mutilayer optical recording medium according to claim 19, wherein the macromolecular material of the energy beam curing type defined in (ii) comprises a copolymer of a (meth)acrylic acid ester in which the alkyl group in the ester portion has 1 to 20 carbon atoms and a monomer having a functional group having active hydrogen.

22. A sheet material for a multilayer optical recording medium which is obtained by transferring the shape of a stamper having protrusions and depressions on a surface of the transfer layer of the energy beam curable type of the sheet material for a multilayer optical recording medium according to claim 2, followed by curing by irradiation with an energy beam.

23. A multilayer structural body for optical recoding medium which is a multilayer structural body for optical recording medium having a repetitive structure comprising a plurality of laminated optical recording layers, wherein the repetitive structure has a structure in which a plurality of units comprising at least an optical recording layer comprising a multiple-photon absorbing material and an adhesive layer are laminated via the adhesive layer, and at lest one sheet material described in claim 22 is disposed between the units.

24. The multilayer structural body for optical recording medium according to claim 6, wherein the sheet material for a multilayer optical recording medium further comprises a transparent resin layer.

* * * * *